(12) United States Patent
Michaelsen et al.

(10) Patent No.: US 11,187,209 B2
(45) Date of Patent: Nov. 30, 2021

(54) BRUSH ASSEMBLY

(71) Applicant: Siemens Gamesa Renewable Energy A/S, Brande (DK)

(72) Inventors: Claus Michaelsen, Herning (DK); Kaj Olsen, Riiskov (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 65 days.

(21) Appl. No.: 16/698,148

(22) Filed: Nov. 27, 2019

(65) Prior Publication Data
US 2020/0182226 A1    Jun. 11, 2020

(30) Foreign Application Priority Data

Dec. 6, 2018 (EP) .................................. 18210740

(51) Int. Cl.
| | | |
|---|---|---|
| *F03D 80/30* | (2016.01) | |
| *H01R 39/38* | (2006.01) | |
| *H01R 39/40* | (2006.01) | |
| *H01R 39/26* | (2006.01) | |

(52) U.S. Cl.
CPC .......... *F03D 80/30* (2016.05); *H01R 39/381* (2013.01); *H01R 39/40* (2013.01); *H01R 39/26* (2013.01)

(58) Field of Classification Search
CPC ....... F03B 80/30; H01R 39/381; H01R 39/40; F03D 80/82
See application file for complete search history.

(56) References Cited

U.S. PATENT DOCUMENTS

| | | | | |
|---|---|---|---|---|
| 662,758 A | * | 11/1900 | Bishop ................... | H01R 39/40 310/245 |
| 2,532,827 A | * | 12/1950 | Thomas ............... | H01R 39/381 310/246 |

(Continued)

FOREIGN PATENT DOCUMENTS

| | | |
|---|---|---|
| CN | 101139964 A | 3/2008 |
| CN | 101588106 A | 11/2009 |

(Continued)

OTHER PUBLICATIONS

English translation of DE1112193B (Year: 1961).*

(Continued)

*Primary Examiner* — David E Sosnowski
*Assistant Examiner* — Wesley Le Fisher
(74) *Attorney, Agent, or Firm* — Schmeiser, Olsen & Watts LLP (57) ABSTRACT

Provided is a brush assembly for transferring lightning current between a first structure and a second structure, which brush assembly includes a holder realized for mounting to one of the two structures; a recess formed in the holder, which recess is shaped to accommodate a brush and to expose a first brush face; and a first displacement means arranged to move the first exposed brush face against a surface of the first structure; and wherein the recess is shaped to also expose a second brush face, and the brush assembly further includes a second displacement means arranged to move the second exposed brush face against a surface of the second structure. Further provided is a lightning protection circuit of a wind turbine; and a wind turbine.

14 Claims, 5 Drawing Sheets

(56) References Cited

U.S. PATENT DOCUMENTS

| | | | | |
|---|---|---|---|---|
| 5,256,925 | A | * 10/1993 | Cutsforth | H01R 39/381 |
| | | | | 310/242 |
| 2008/0063546 | A1 | 3/2008 | Itoh et al. | |
| 2008/0197745 | A1* | 8/2008 | Eger | H02K 5/148 |
| | | | | 310/240 |
| 2009/0284097 | A1 | 11/2009 | Kaneda et al. | |
| 2013/0336786 | A1 | 12/2013 | Kissinger | |
| 2017/0179793 | A1 | 6/2017 | Servin et al. | |
| 2018/0301962 | A1 | 10/2018 | Scalzo, III et al. | |

FOREIGN PATENT DOCUMENTS

| | | | | |
|---|---|---|---|---|
| CN | 202817454 | U * | 3/2013 | |
| CN | 106972678 | A | 7/2017 | |
| CN | 206922025 | U | 1/2018 | |
| CN | 108736284 | A | 11/2018 | |
| CN | 108799017 | A * | 11/2018 | |
| CN | 208106667 | U | 11/2018 | |
| DE | 1112193 | B * | 8/1961 | H01R 39/381 |
| EP | 0304528 | A2 * | 3/1989 | H01R 39/381 |
| EP | 1154537 | A2 * | 11/2001 | H02G 13/40 |
| GB | 2189653 | A * | 10/1987 | H01R 39/40 |
| JP | H0560053 | A | 7/1985 | |
| JP | H0560053 | A | 3/1993 | |
| JP | 2764386 | B2 | 6/1998 | |
| WO | 2018137804 | A1 | 8/2018 | |
| WO | WO 2018137804 | A1 | 8/2018 | |

OTHER PUBLICATIONS

EPO search report/opinion of foreign filing of instant application (dated 2020).*
English translation of EP1154537A2 (Year: 2001).*
English Translation of CN108799017A (Year: 2018).*
English translation of CN202817454U (Year: 2013).*
European Search Report dated Apr. 11, 2019 for Application No. 18210740.9.
Chinese Office Action for Application No. 201911242959.5, dated Jan. 14, 2021.

* cited by examiner

BRUSH ASSEMBLY

CROSS-REFERENCE TO RELATED APPLICATIONS

This application claims priority to EP Application No. 182107840.9, having a filing date of Dec. 6, 2019, the entire contents of which are hereby incorporated by reference.

FIELD OF TECHNOLOGY

The following relates to a brush assembly, a lightning protection circuit, and a wind turbine.

BACKGROUND

Because of its height and generally exposed location, a wind turbine may receive frequent lightning strikes and must be equipped with a reliable lightning protection system (LPS) to prevent damage to its rotor blades, its electrical components, and its structural components. A wind turbine rotor blade is normally provided with one or more receptors on its outer surface that act to attract a lightning strike. Each receptor is connected to a download cable or "down conductor" extending through the blade interior. A down conductor usually extends from near the thin blade tip (at the outermost end of the blade) to the circular root (at the innermost end of the blade, where it is mounted to the hub) and is dimensioned to safely transport lightning current.

Unusually, the only physical connection between the rotatory part of the wind turbine and the stationary part of the wind turbine is via a bearing. This must also be protected from lightning current. Therefore, the wind turbine's LPS must include some kind of lightning current bridge from the rotating part of the wind turbine to its stationary part. From each blade root end, lightning current must be led to the stationary region of the wind turbine, from which it can be transported through a down conductor arrangement through the tower and to ground.

The rotatory part of a wind turbine generally comprises the aerodynamic rotor with its rotor blades and hub, as well as any part that is directly or indirectly turned by the aerodynamic rotor, e.g. a low-speed main shaft, an outer rotor, etc. along with the rotatory part of any bearing. The stationary part of a wind turbine can include any non-rotating parts, for example the stationary part of any bearing, a nacelle or canopy, the tower, etc. Therefore, the usual way of providing a path for lightning current from the rotatory part of the wind turbine to the stationary part is by means of a sliding brush connection at the interface between any down conductors of the rotatory part to the further LPS path through the stationary part to ground. A carbon or graphite brush is generally in the shape of a block, and current is transported to the brush via a cable that terminates in the body of the brush. One face of the brush is pressed against a surface of the rotatory/stationary interface. Lightning current will pass through the brush on its path to ground, and the capacity of the brush to carry current is largely determined by the capacity of the brush cable and the area of the contact face, i.e. by the cross-sectional area of the brush. Because of the need to transport extremely high lightning currents reliably and efficiently over a very brief time, a conventional LPS for a wind turbine will generally make use of multiple such brushes at the interface between the rotatory part and the stationary part.

However, as generator designs become more compact, it is becoming increasingly difficult to incorporate the conventional brushes in the LPS in such a way that the brush assemblies can also be accessed for regular maintenance, since the carbon/graphite brushes wear down over time and need to be exchanged at regular intervals. The need to include the plurality of brushes means that the generator design is subject to additional constraints, and this can require undesirable compromises to be made.

SUMMARY

An aspect relates to providing an improved way of guiding lightning current through the rotatory/stationary interface of a wind turbine.

A brush assembly is typically realized for transferring an electric current between a first structure and a second structure. One of these structures is typically stationary, while the other is rotatory. A brush assembly comprises a holder with a recess shaped to accommodate a brush. For the purposes of explaining embodiments of the invention, it shall be assumed that the holder is mounted to the second structure. The recess is formed such that a brush face is exposed, and the brush assembly further comprises a means of ensuring that the exposed brush face makes contact with a surface of the first structure. Electric current transferred to the brush will then be able to pass between the first and second structures. The inventive brush assembly is characterized in that the recess is shaped to also expose a second brush face; and the brush assembly also comprises a means of ensuring that this second exposed brush face makes contact with a surface of the second structure.

In a conventional brush assembly, the electric current is transferred to the brush by means of a brush cable that terminates in the body of the brush, and the current is then transferred between the first and second structures through a single brush face. In the inventive brush assembly, electric current is transferred to the brush through the second exposed brush face. An advantage of the inventive brush assembly is therefore a significantly lower impedance compared to a conventional brush assembly. The significantly lower impedance advantageously reduces the voltage drop at the interface between the first and second structures. Instead of channeling the electric current to a brush cable for transfer to the brush, it can pass directly through the brush body from one structure to the other, entering and exiting the brush through an exposed brush face.

Since the design of the inventive brush assembly remains similar to the design of conventional brush assemblies—with regard to the holder and the first displacement means—the cost of manufacturing the inventive brush assembly is essentially the same. However, because the inventive brush assembly is considerably more effective in safely transferring high transient currents, it is possible to use a reduced number of these brush assemblies in a large electrical machine, thereby reducing the costs of manufacture and also reducing the costs associated with regular maintenance procedures.

According to embodiments of the invention, the lightning protection circuit of a wind turbine comprises a first current path arrangement realized to provide a path for lightning current through the rotatory part of a wind turbine towards an interface to the stationary part of the wind turbine; a second current path arrangement realized to provide a path for lightning current through the stationary part of the wind turbine to ground; and an embodiment of the inventive brush assembly for electrically connecting the first current path arrangement to the second current path arrangement. The inventive brush assembly ensures that any lightning current sees only a low impedance at the interface between the rotatory part and the stationary part, and can be safely and reliably transported across this interface.

According to embodiments of the invention, the wind turbine can comprise a number of such lightning protection circuits. For example, one lightning protection circuit may be used to transfer lightning current from the rotor blades to the stationary part of the wind turbine; another lightning protection circuit may be used to transfer lightning current from an outer rotor of the generator to the stationary part of the wind turbine; etc. Any such lightning protection circuit can implement an embodiment of the inventive brush assembly at an interface between a rotatory part and a stationary part.

In the following, without restricting embodiments of the invention in any way, it may be assumed that a brush is a block of carbon or graphite material. It may also be assumed that the exposed first face is adjacent to the exposed second face. The carbon/graphite block can have an essentially rectangular shape, i.e. the shape of a brick. In that case, the exposed first and second brush faces are essentially orthogonal to each other, i.e. these faces are perpendicular. A brush can have any suitable dimensions, for example to present a first exposed face with side lengths in the order of 10 mm-30 mm, and to present a second exposed face with side lengths in the order of 30-50 mm. The actual brush dimensions may vary and may be chosen in dependence of various factors, of which current carrying capacity is most relevant.

The brush assembly is arranged at the interface between the first structure and the second structure. One of these is stationary, while the other is rotatable. The brush assembly can be secured to the stationary structure, so that its first exposed face is pressed against a surface of the rotating structure. In such an embodiment, the stationary structure can be regarded as a supporting structure for the brush assembly, while the rotatable structure may be regarded as a sliding structure, since—from the viewpoint of the brush—when it rotates, it appears to slide past the exposed first brush face.

Equally, the brush assembly can be secured to the rotatory structure, so that its first exposed face is pressed against a surface of the stationary structure. In such an embodiment, the rotatory structure can be regarded as the supporting structure for the brush assembly, while the stationary structure may be regarded as the sliding structure, since—from the viewpoint of the brush mounted to the rotatory structure—the stationary structure appears to slide past the exposed first brush face. In the following, the terms "first structure" and "sliding structure" may be regarded as synonyms unless otherwise indicated. Similarly, the terms "second structure" and "supporting structure" may be regarded as synonyms unless otherwise indicated.

The first displacement means may be realized to press against the brush face that is parallel to and opposite the first exposed face. A displacement means may be understood to be any device or component that can apply a force to move the brush in a desired direction. In the following, without restricting embodiments of the invention in any way, it may be assumed that a displacement means is realized as a spring-loaded mechanism to press the brush in the desired direction. For example, the first displacement means can be a spring-loaded mechanism arranged to press the first exposed brush face with an essentially constant pressure against a surface of the sliding structure. This first displacement means can comprise the same kind of spring that is usually used in a conventional brush assembly, and which is able to maintain the desired pressure even as the brush wears down by friction between the exposed first brush face and the surface of the sliding structure.

The second displacement means may be realized to press against the brush face that is parallel to and opposite the second exposed face. The second displacement means can also be a spring-loaded mechanism, in this case a mechanism that presses the second exposed brush face against a surface of the supporting structure. In a particularly exemplary embodiment of the invention, the second displacement means comprises a plate arranged to press against the brush face that is opposite the second exposed face. The plate can have the same size as the brush when it is new, i.e. when it fills the recess in the holder. As an alternative to a flat plate, the second displacement means can for example comprise one or more spherical or cylindrical rollers that are free to rotate in a suitable holder. A spherical roller will only make a point contact to the rear surface of the brush, and a cylindrical roller will only make a line contact to the rear surface of the brush.

Because the brush assembly is mounted to the supporting structure, the second exposed brush face will not be subject to wear. The second displacement means need not be as strong as the first displacement means.

As indicated above, the exposed first brush face will be subject to wear, because it is continually pressed against the surface of the sliding structure. This means that the gradually diminishing remainder of the brush is moved slowly but steadily in the direction of the sliding structure. It is important not to obstruct this movement. Therefore, in a further exemplary embodiment of the invention, the second displacement means comprises a low-friction or frictionless contact to the brush. For example, if the second displacement means comprises a plate to press against the brush, this plate can be given a low-friction surface so that the brush can freely slide over the plate in the direction of the sliding structure. Similarly, a point contact or line contact between a rolling element and the brush will be inherently low-friction.

In a further exemplary embodiment of the invention, the brush assembly further comprises a brush cable arranged to terminate in the body of the brush, and a connector for electrically connecting the brush cable to the supporting structure. A brush equipped with a brush cable may be deployed in applications in which it is desirable to also guide smaller currents to ground (in addition to the large lightning currents). The inherent higher impedance of the brush cable does not present an obstacle to currents such as capacitive leak currents from a frequency converter, for example.

In an exemplary embodiment of the invention, the wind turbine comprises a lightning protection circuit in which the brush assembly is mounted at an interface between the generator rotor and a stationary part, for example a stationary generator housing, a rotor brake plate, a canopy or nacelle, etc. In a direct-drive wind turbine, for example, a brush assembly can be mounted at an interface between the outer rotor and a front plate of the stator. These parts can be made of steel and can therefore be inherently conductive, so that transfer of high lightning currents across this interface can be done safely and reliably.

In an exemplary embodiment of the invention, the current path arrangement of a lightning protection circuit includes the supporting structure to which the brush assembly is mounted, i.e. the body of the supporting structure is electrically conductive and is part of the electrical circuit. The electrical connection between that current path arrangement and the brush is through the second exposed face of the brush.

In a further exemplary embodiment of the invention, the current path arrangement of a lightning protection circuit includes the sliding structure against which the first exposed face of the brush is pressed, i.e. the body of the sliding structure is electrically conductive and is part of the electrical circuit.

Alternatively, the sliding structure and/or the supporting structure can be provided with suitable electrically conductive contact surfaces so that lightning current can pass via the brush between the sliding structure and the supporting structure on its way to ground.

BRIEF DESCRIPTION

Some of the embodiments will be described in detail, with reference to the following figures, wherein like designations denote like members, wherein.

In the diagrams, like numbers refer to like objects throughout. Objects in the diagrams are not necessarily drawn to scale.

DETAILED DESCRIPTION

Figure 1:
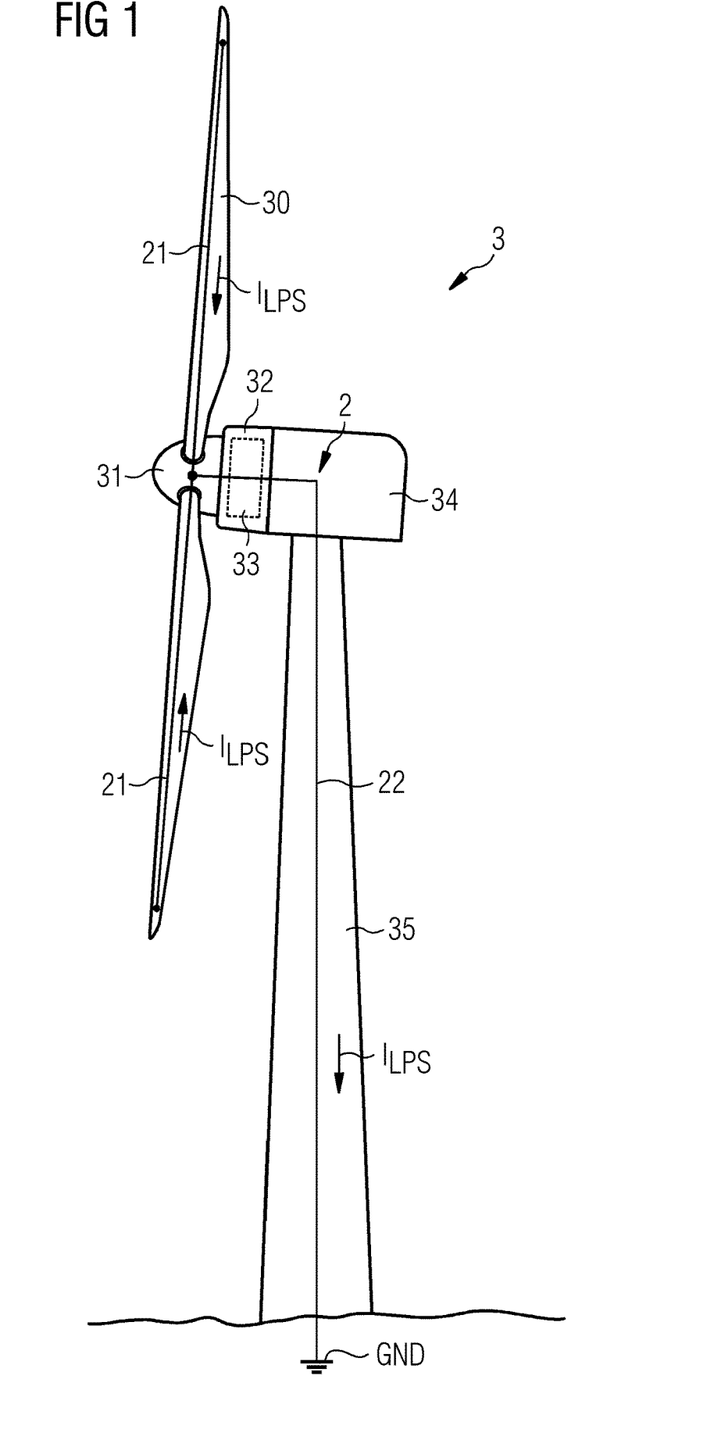
FIG. 1 is a simplified representation of a direct-drive wind turbine and its lightning protection system.

FIG. 1 is a simplified diagram of a direct-drive wind turbine 3 and its LPS 2. The aerodynamic rotor of the wind turbine comprises the rotor blades 30 mounted to the hub 31. The outer rotor 32 of the generator can be enclosed in a housing that rotates as one with the outer rotor 32. The diagram also shows a stationary canopy 34 or nacelle 34. The stator 33 of the generator is mounted in some way to a bedframe or fixed support, and connected to the rotor 32 by means of a bearing arrangement. The stationary part of the wind turbine 3 is mounted by means of a yaw interface at the top of a tower 35.

To safely conduct lightning current to ground, each rotor blade 30 is equipped with a number of receptors connected to a down conductor of a current path arrangement 21. A rotor blade down conductor is arranged in the interior of the blade 30. All down conductors of this current path arrangement 21 can convene in the hub 31, and the lightning current $I_{LPS}$ is transferred by an embodiment of the inventive brush assembly (not shown here) to a further current path arrangement 22 that transports the lightning current $I_{LPS}$ through the stationary part of the wind turbine 3 and safely to ground GND.

Figure 2:
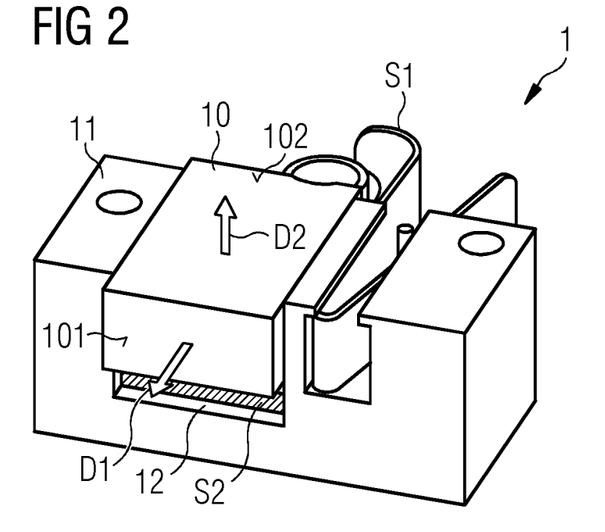
FIG. 2 shows a first embodiment of the inventive brush assembly.
Figure 3:
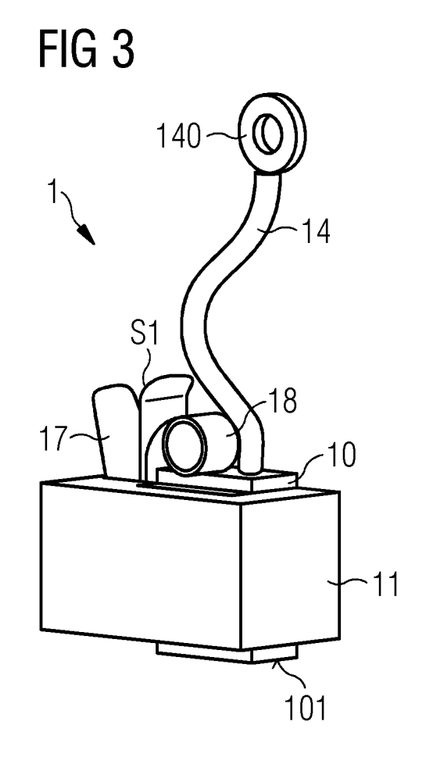
FIG. 3 shows a second embodiment of the inventive brush assembly.
Figure 4:
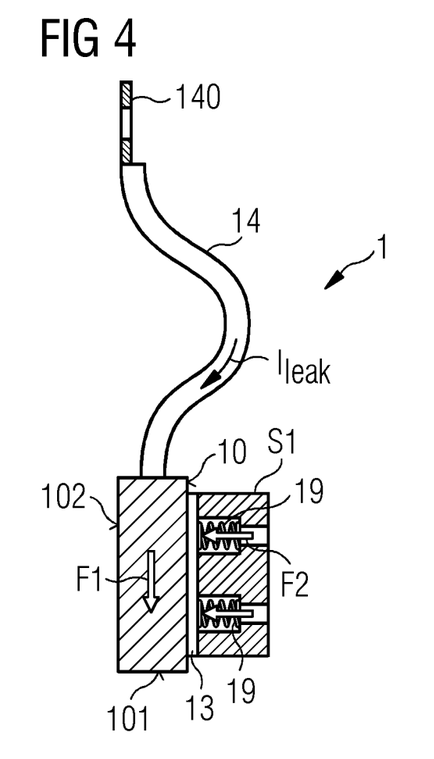
FIG. 4 shows a partial cross-section of the embodiment of FIG. 3.

FIG. 2 shows a first embodiment of the inventive brush assembly 1, with another view of a second embodiment given in FIG. 3, and a partial cross-section given by FIG. 4. The brush assembly 1 comprises a holder 11 with a recess 12 shaped to accommodate a carbon or graphite brush 10 with an essentially rectangular form. The diagram also indicates through-holes which can be used to fasten the brush assembly 1 to a supporting structure (not shown). The brush assembly 1 is constructed to expose two faces 101, 102 of the brush 10. These two faces 101, 102 are essentially orthogonal and can be pressed against orthogonal receiving surfaces of the supporting structure and sliding structure (not shown). To this end, the inventive brush assembly 1 is constructed to apply two orthogonal forces F1, F2 on the brush 10, so that it will be pushed in two orthogonal directions when the brush assembly 1 is installed at an interface between a rotating body and a stationary body. An electrical connection between the rotatory body and a stationary body is therefore presented by these orthogonal brush faces 101, 102, so that this electrical connection is characterized by a favorably low impedance. Such a favorably low impedance is an advantage when large lightning currents must be transferred rapidly across the interface between the rotatory structure and the stationary structure.

To achieve the desired forces F1, F2, a first spring-loading means S1 is provided to push the brush 10 in a first direction D1, and a second (weaker) spring-loaded means S2 is provided to push the brush 10 in a second direction D2. The first spring-loading means S1 can include a powerful spring 18 as known from the conventional brush assembly, to achieve a strong force F1, with a release clip 17 to allow the spring 18 to be removed when a worn brush must be replaced by a new brush. In this exemplary embodiment, the second spring-loaded means S2 is provided with a low-friction plate 13 and a relatively weak spring-loaded means 19 so that the brush 10 is not prevented from moving relative to this plate 13 when pushed in the first direction D1 in response to force F1.

In the embodiment shown in FIG. 2, the brush assembly 1 deploys only a block-shaped brush 10 that is not attached to any brush cable, and which is transports lightning current directly between the supporting structure and the sliding structure, through the exposed faces 101, 102 of the brush 10. In the embodiment shown in FIG. 3 and FIG. 4, the brush assembly 1 also includes a brush cable 14. Here, the brush cable 14 is provided as an integral part of the brush 10. One end of the brush cable 14 effectively terminates in the body of the brush 10. The other end of the brush cable 14 terminates in a connector 140 with which an electrical connection may be made between the brush cable 14 and the supporting structure to which the brush assembly 1 is mounted. The brush cable 14 may serve to continuously guide relatively small trickle currents $I_{leak}$ to ground, for example.

Figure 5:
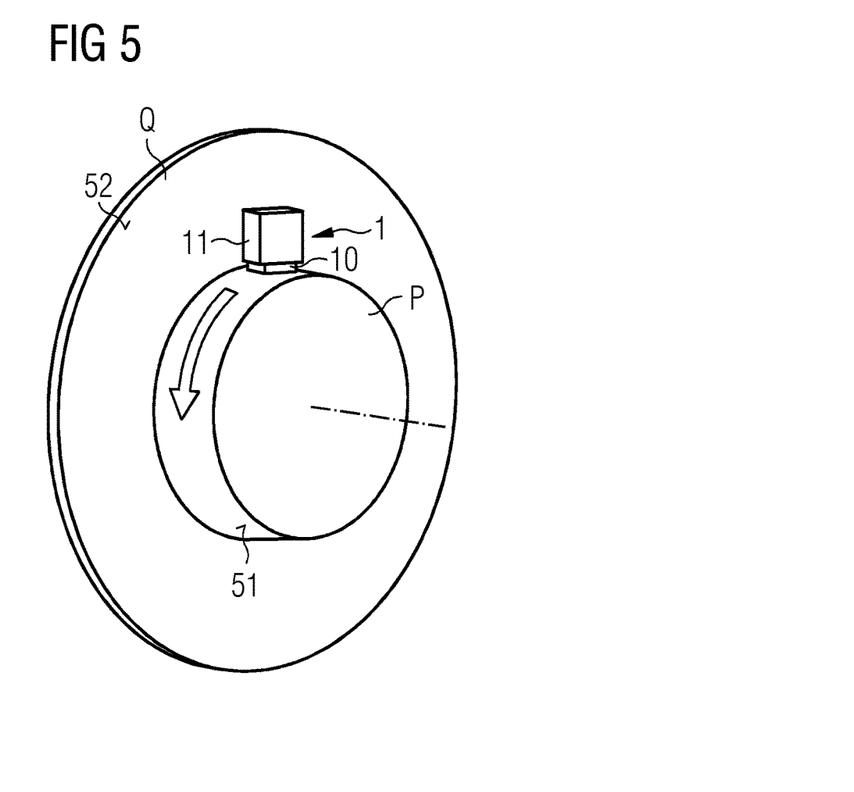
FIG. 5 shows an embodiment of the inventive brush assembly in place in a first environment.
Figure 6:
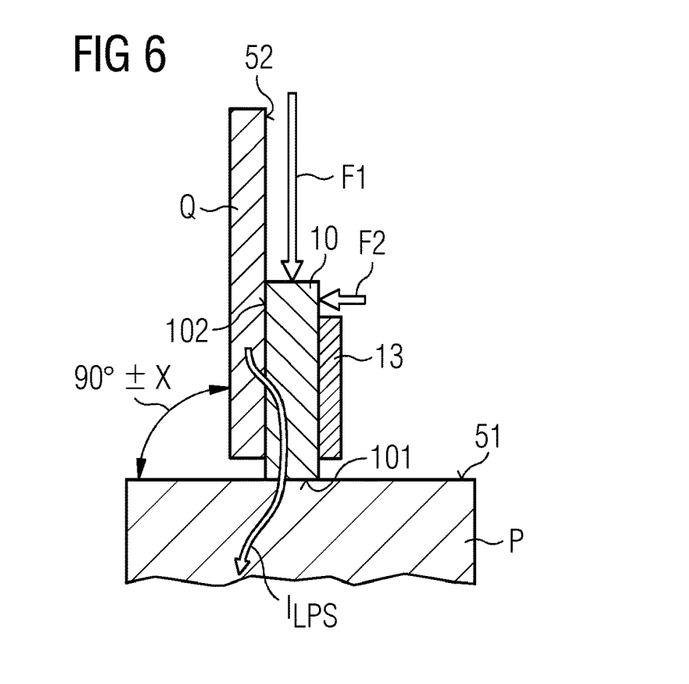
FIG. 6 shows a cross-section of the embodiment of FIG. 5.

FIG. 5 shows an embodiment of the inventive brush assembly 1 (indicated only very schematically) in place in a first environment. Here, the brush assembly 1 is arranged at an interface between a stationary component Q and a rotatory component P, for example in an electrical machine comprising a stator Q and a rotating main shaft P. It is assumed that the body of the stator Q and the body of the rotating main shaft P are electrically conductive and are being used in a circuit path to guide lightning current to ground. In this exemplary embodiment, the holder 11 is secured to the stationary component Q, for example by bolts or other fasteners (not shown), so that the brush assembly 1 is also stationary relative to the rotatory component P. The first face 101 of the brush 10 is pressed against a surface 51 of the rotatory component P, while the second face 102 of the brush 10 is pushed against a surface 52 of the stationary component Q. In this way, a very low impedance connection is achieved between the stationary component Q and the rotatory component P, and large lightning currents $I_{LPS}$ can be safely transferred between these components Q, P on their way to electrical ground. FIG. 6 shows this embodiment in cross-section (for the sake of clarity, the diagram does not show the holder 11 or the spring-loaded means S1, S2), and illustrates the surface contact between the first exposed face 101 of the brush 10 and the sliding surface 51 of the rotatory component P, and the favorably large surface contact between the second exposed face 102 of the brush 10 and the surface 52 of the stationary component Q. The stationary component Q might be a stator front plate, while the rotatory component P may be the rotatable main shaft of an indirect-drive generator. The contact surfaces 51, 52 of these components Q, P are generally at right angles to one another at their interface, but it shall be understood that some tolerance is acceptable, so that the angle subtended between the contact surfaces 51, 52 may be assumed to be 90°±some tolerance. This cross-section applies also to the following two embodiments.

Figure 7:
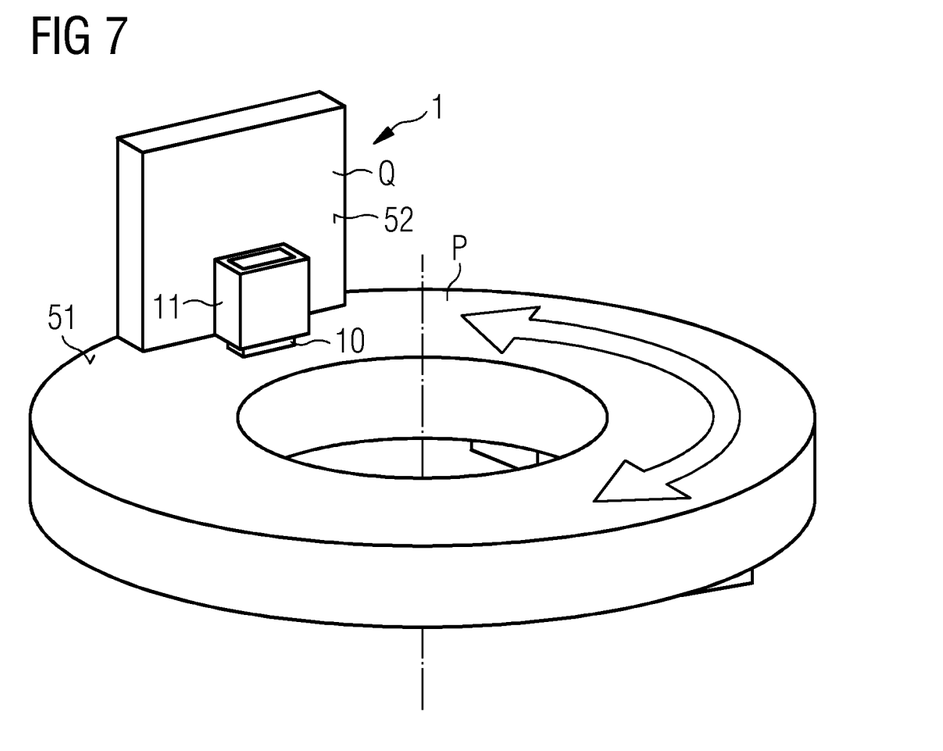
FIG. 7 shows an embodiment of the inventive brush assembly in place in a first environment.

FIG. 7 shows an embodiment of the inventive brush assembly 1 in place in a second environment. Here, the first structure P is a rotatory component of the aerodynamic rotor or outer rotor of a direct-drive wind turbine, for example. The second structure Q is a stationary component, for example a structural part of a bedframe. Here also, it is assumed that the body of the stationary component Q and the body of the rotatory component P are electrically conductive and are being used in a circuit path to guide lightning current to ground. Again, the brush assembly 1 is arranged at an interface between the stationary component Q and the rotatory component P. In this embodiment also, the holder 11 is secured to the stationary component Q, for example by bolts or other fasteners (not shown), so that the brush assembly 1 is held still relative to the rotatory component P. The first face 101 of the brush 10 is pushed against a sliding surface 51 of the rotatory component P, while the second face 102 of the brush 10 is pressed against a surface 52 of the stationary component Q. This embodiment is in principle the same as the embodiment of FIG. 6, with the difference that the sliding surface 51 of the rotatory component is in the same plane as the first exposed brush face 101.

Figure 8:
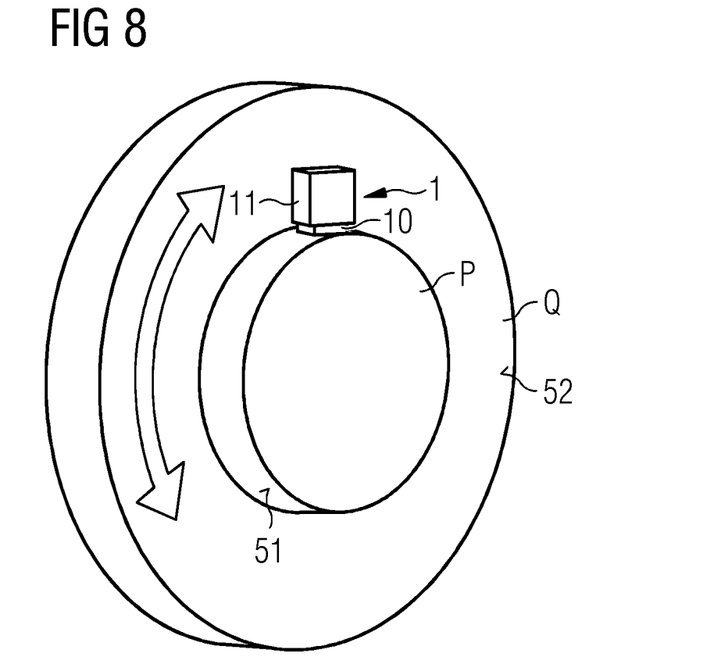
FIG. 8 shows an embodiment of the inventive brush assembly in place in a first environment.

FIG. 8 shows an embodiment of the inventive brush assembly 1 in place in a third environment. Here, the first structure P is stationary, and the second structure Q is rotatory. In this case also, it is assumed that the body of the rotatory component Q and the body of the stationary component P are electrically conductive and are being used in a circuit path to guide lightning current to ground. The brush assembly 1 is arranged at the interface between the stationary component P and the rotatory component Q. In this embodiment, the holder 11 is secured to the rotatory component Q, for example by bolts or other fasteners (not shown), so that the brush assembly 1 is held still relative to the stationary component P, and the rotatory component Q appears to slide past the first exposed face 101 of the brush 10. Therefore, the first face 101 of the brush 10 is effectively pushed against a "sliding surface" 51 of the stationary component P, while the second face 102 of the brush 10 is pressed against a surface 52 of the second structure Q. The cross-section of FIG. 6 applies here also, with the difference that the sliding surface 51 "seen" by the first exposed brush face 101 is actually stationary, the apparent rotation arising from the fact that the brush assembly 1 is attached to the rotatory component Q.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A brush assembly for transferring lightning current between a first structure and a second structure in a wind turbine, the brush assembly comprising:
a holder for mounting to one of the first structure and the second structure;
a recess formed in the holder, wherein the recess is shaped to accommodate a brush and to expose a first brush face; and
a first displacement means arranged to press the first exposed brush face against a surface of the first structure;
wherein the recess is shaped to also expose a second brush face, and the brush assembly further comprises a second displacement means arranged to press the second exposed brush face against a surface of the second structure;
wherein the first structure includes a first current path arrangement configured to provide a path for lightning current through a rotatory part of the wind turbine towards an interface;
wherein the second structure includes a second current path arrangement configured to provide a path for lightning current through the stationary part of the wind turbine to ground; and
wherein the brush assembly is configured to connect the first current path arrangement and the second current path arrangement.

2. The brush assembly according to claim 1, wherein the brush has the shape of a block, and wherein the first brush face is perpendicular to the second brush face.

3. The brush assembly according to claim 1, wherein the first displacement means comprises a spring configured to press against the brush face that is opposite the first exposed brush face.

4. The brush assembly according to claim 1, wherein the first displacement means comprises a release means arranged to facilitate removal of a worn brush from the holder and to allow insertion of a replacement brush into the holder.

5. The brush assembly according to claim 1, wherein the second displacement means comprises a low-friction contact to a brush face that is opposite the second exposed brush face.

6. The brush assembly according to claim 1, wherein the second displacement means comprises a plate arranged to lie against a brush face that is opposite the second exposed brush face.

7. The brush assembly according claim 1, wherein the second displacement means is spring-loaded.

8. The brush assembly according to claim 1, further comprising a brush cable arranged to terminate in a body of the brush, and a connector for connecting the brush cable to one of the first structure and the second structure.

9. A lightning protection circuit of a wind turbine, comprising:
a first current path arrangement configured to provide a path for lightning current through a rotatory part of the wind turbine towards an interface to a stationary part of the wind turbine;

a second current path arrangement configured to provide a path for lightning current through the stationary part of the wind turbine to ground; and a brush assembly for electrically connecting the first current path arrangement to the second current path arrangement, wherein the brush assembly includes a holder for mounting to one of the rotary part and the stationary part; a recess formed in the holder, wherein the recess is shaped to accommodate a brush and to expose a first brush face and a second brush face; a first displacement means arranged to press the first exposed brush face against a surface of the first structure; and a second displacement means arranged to press the second exposed brush face against a surface of the second structure.

10. A wind turbine comprising the lightning protection circuit according to claim 9, wherein the brush assembly is mounted at an interface between a generator rotor and a generator stator.

11. The wind turbine according to claim 10, wherein the brush assembly is mounted at an interface between the generator rotor and a stationary housing.

12. The wind turbine according to claim 10, wherein a current path arrangement of the lightning protection circuit includes an electrically conductive structure to which the brush assembly is mounted.

13. The wind turbine according to claim 10, wherein the brush assembly of the lightning protection circuit comprises a brush cable, and wherein the brush cable is electrically connected to a structure to which the brush assembly is mounted.

14. The wind turbine according to claim 10, wherein the wind turbine is configured as a direct-drive wind turbine.

* * * * *